4 Sheets—Sheet 1.
E. L. CLARK.
ROLLING MILL PLANT.
No. 11,280. Reissued Oct. 25, 1892.
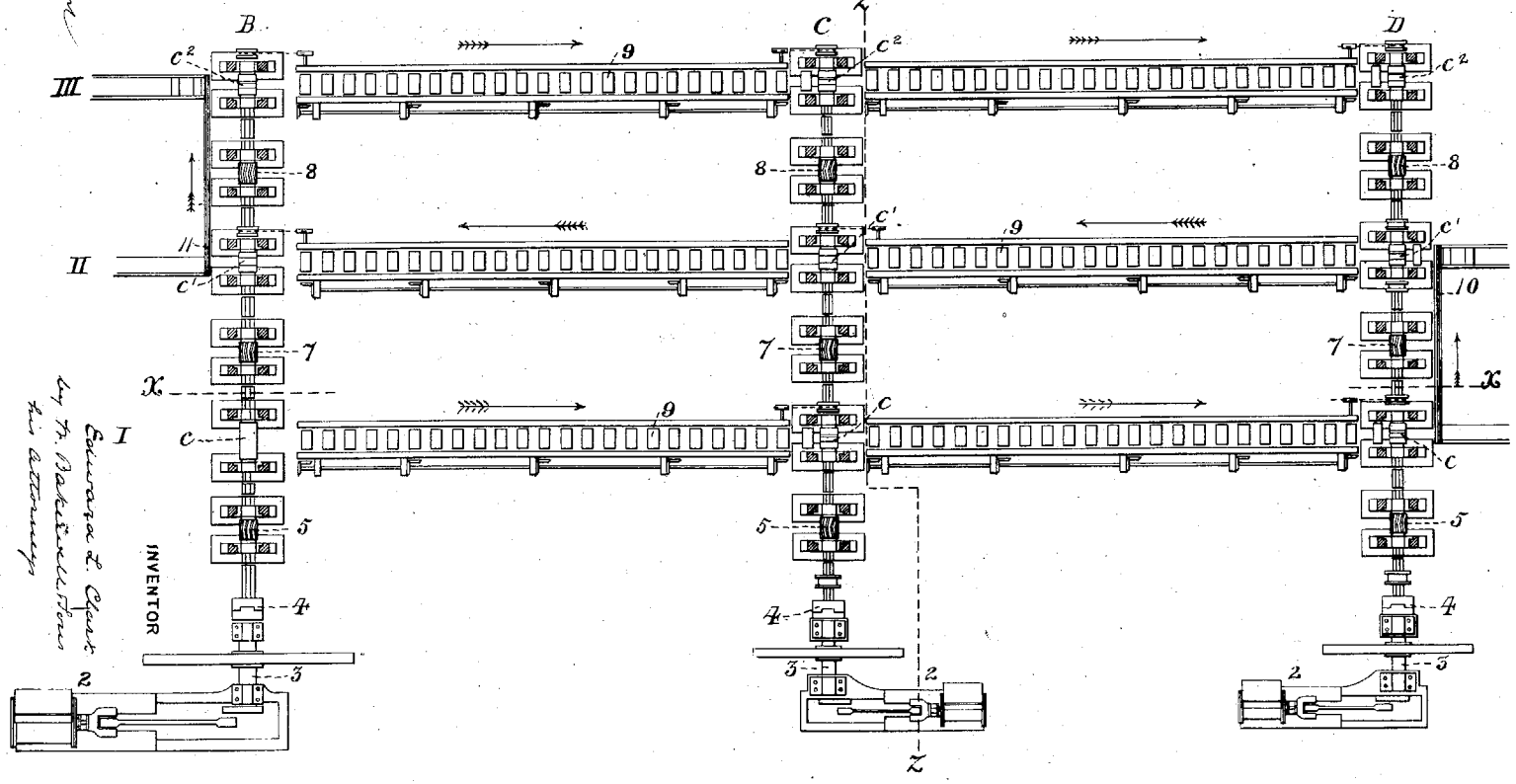

4 Sheets—Sheet 2.
E. L. CLARK.
ROLLING MILL PLANT.
No. 11,280. Reissued Oct. 25, 1892.
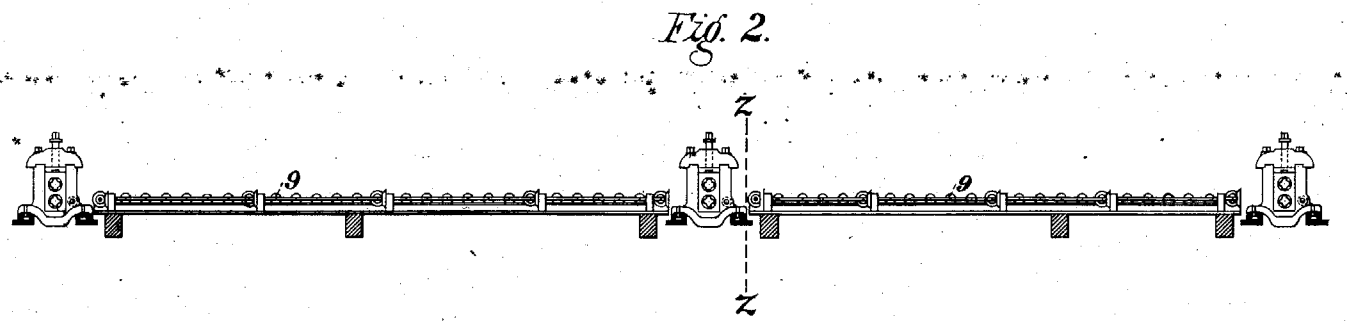
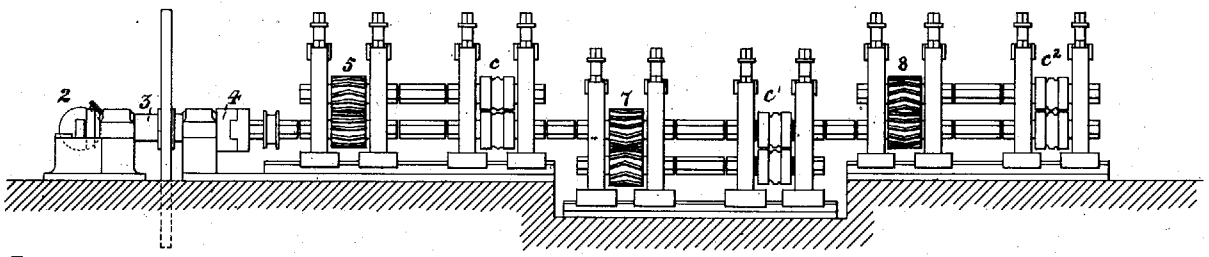
WITNESSES
C. Byrnes
S. M. Cowin
INVENTOR.
Edward L. Clark
by T. Bakewell & Sons
his attorneys

E. L. CLARK.
ROLLING MILL PLANT.
No. 11,280. Reissued Oct. 25, 1892.
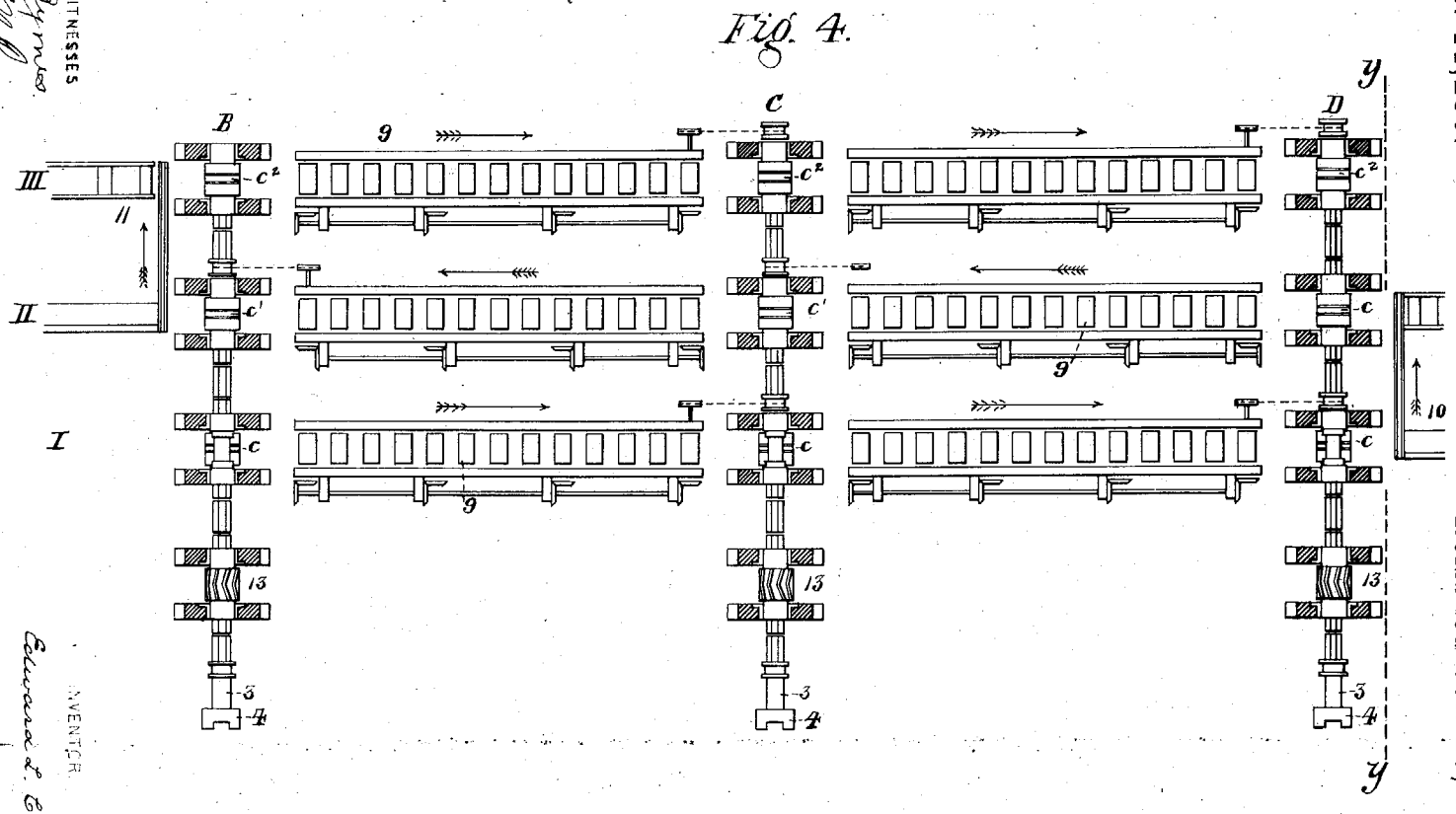
WITNESSES
C. Byrnes.
J. V. McCorrow
INVENTOR.
Edward L. Clark
by N. Bakewell & Sons
his attorneys

E. L. CLARK.
ROLLING MILL PLANT.
No. 11,280. Reissued Oct. 25, 1892.
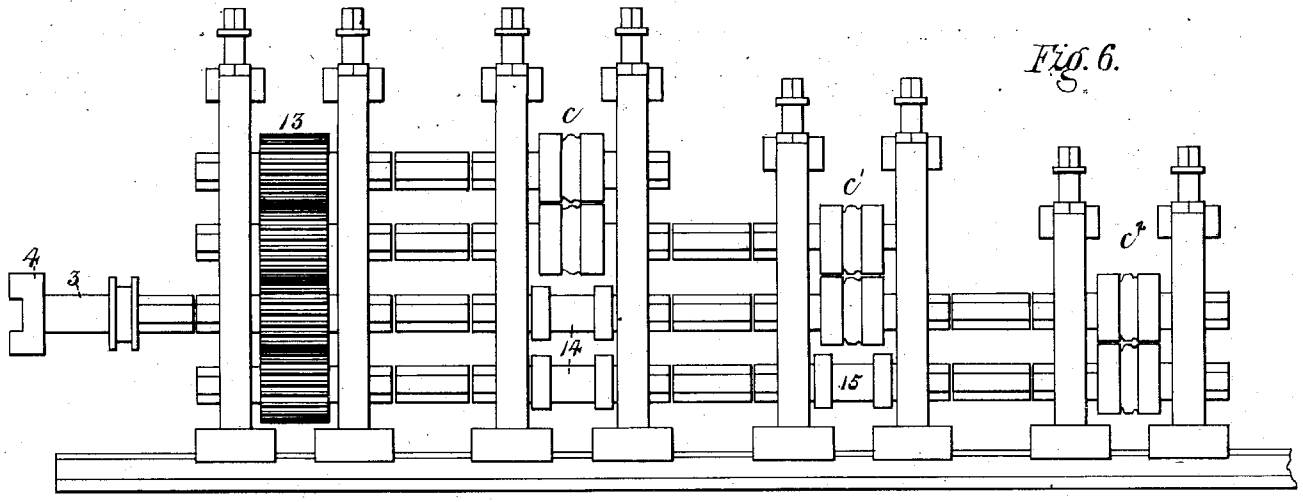
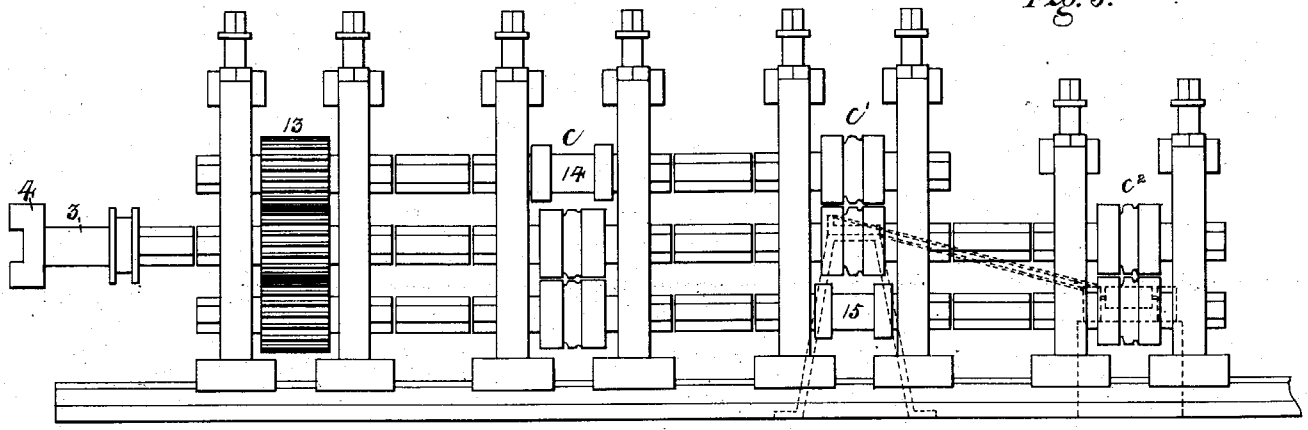
WITNESSES:
C Byrnes
N. M. Comm
INVENTOR.
Edward L. Clark
by H. Bakewell & Sons
his Attorneys

UNITED STATES PATENT OFFICE.

EDWARD L. CLARK, OF PITTSBURG, PENNSYLVANIA.

ROLLING-MILL PLANT.

SPECIFICATION forming part of Reissued Letters Patent No. 11,280, dated October 25, 1892.

Original No. 397,339, dated February 5, 1889. Application for reissue filed September 3, 1891. Serial No. 404,684.

*To all whom it may concern:*

Be it known that I, EDWARD L. CLARK, of Pittsburg, in the county of Allegheny and State of Pennsylvania, have invented a new and useful Improvement in Rolling-Mill Plants, of which the following is a full, clear, and exact description, reference being had to the accompanying drawings, forming part of this specification, in which—

Figure 1 is a plan view of my improved mill plant. Fig. 2 is a vertical longitudinal section on the line $x\ x$ of Fig. 1. Fig. 3 is a vertical cross-section on the line $z\ z$ of Figs. 1 and 2. Fig. 4 is a plan view, and Fig. 5 an end elevation, of a modified form of the plant. Fig. 6 is an end elevation of a second modified form of the plant.

Like symbols of reference indicate like parts in each.

In rolling long steel and iron articles—such as railroad-rails—it has been customary to employ a series of two or more sets of three-high rolls, through each of which sets the metal is passed back and forth a sufficient number of times to effect the desired reduction. The objection to this mode of rolling is that as each set of rolls can be employed to roll but one piece at a time, and as the time consumed in the reduction of the piece at each set is considerable, the output of the mill plant is limited. Besides this objection, the fact that with three-high rolls it is necessary to use complicated and cumbrous mechanism—such as lifting-tables—for the purpose of transferring the metal from one pass of the rolls to the other, or in place thereof to employ arduous manual labor to effect the same result, very considerably adds to the cost. These difficulties may be avoided by the use of a continuous mill plant in which there are a number of two-high rolls arranged in line, through which the metal piece passes in a continuous direction, because in such case the metal passes but once through each set of rolls, and, if desired, a succession of several pieces of metal may be passed through the rolls at a single time. The objection to this form of plant, however, is that the amount of space taken up by the long line of rolls makes the mill disproportionately long, and thus indirectly increases the labor and the amount of machinery necessary to be employed, and that the number of engines required to drive all the rolls involves an undue expense in supplying the necessary power. There is also a form of mill plant in which two-high reversible rolls with a number of grooves or passes are employed to effect the reduction of the metal; but although these, in common with the two-high continuous plant, make it unnecessary to use lifting-tables, and although the plant is not excessively large, they are subject to a like objection with the three-high rolls, in that only one piece of metal can be passed through each set of rolls at a time and that the operations of the mill are thus restricted.

The object of my invention is to provide a mill plant which shall combine the advantages of all the systems above described—that is to say, one in which it is unnecessary to employ lifting-tables and in which the metal can be rolled with the same rapidity as in continuous mills of the usual construction without the disadvantages resulting from the large room and the amount of power necessary in such mills.

Referring now to Figs. 1, 2, and 3 of the drawings, B, C, and D represent three rows or systems of rows, each of which is driven by a separate driving-engine 2. Fig. 3 shows in elevation the arrangement of one of these rows of rolls, and the others are similarly arranged. The driving-shaft 3 of the engine 2 is connected by a clutch 4 with the shaft of one of a pair of pinions 5, the shafts of which are connected by suitable coupling devices with a pair of rolls $c$. The axis of the lower of these rolls is coupled with the upper of two pinions 7, whose shafts are coupled with a pair of rolls $c'$. The shaft of the upper of the latter rolls is coupled with a pair of pinions 8, the shafts of which pinions are coupled with the axes of a pair of rolls $c^2$. The pinions 5, 7, and 8 and the rolls $c$, $c'$, and $c^2$ are mounted in suitable housings, as clearly shown in the drawings, and the rolls may be grooved or otherwise, as their use may require. It will thus be seen that each adjacent pair of rolls rotates in a different direction by reason of the driving connection being made alternately with the upper and lower member of the pair—*i. e.*, that the rolls $c$ and $c^2$ will cause the metal passing therethrough to travel in the same direction and that the rolls $c'$ will cause the metal to travel in the opposite direction. The power connection may, however, be made in other ways to secure the same alternate reverse motion of the sets of rolls, and, if desired, interposed speed-gearing may be employed to cause the rolls to revolve at different rates of speed.

The rows of rolls B, C, and D are set parallel with each other, and the corresponding members of each row are connected by feed-rollers 9, which are driven by suitable power connections, so that each line of feed-rollers shall rotate in the same direction as the rolls which are interposed in such line. I have thus a mill composed of three lines of rolls I, II, and III, with three rolls in each line, affording in all nine passes for the metal; but for the purposes of my invention there may be any greater or less number of rolls arranged in two or any greater number of lines and with any suitable number of rolls in each line.

The operation is as follows: The metal bloom or ingot which is to be rolled in the mill is introduced into the first pair of rolls in the line of rolls I, and on passing therethrough is conveyed by the feed-rollers in the direction of the arrow to and through the second and third sets of rolls of the line in succession. As the piece emerges from the third set of rolls it is received on a bed or frame 10, and by means of suitable shifting mechanism is carried laterally to a position opposite to the end roll of line II and is fed thereto. The rolls of this line and their feed-rollers travel in a direction reverse to that of the line I and carry the piece in the direction of the arrow through the three rolls in succession, and on its emerging from the third roll of the line it is received by a shifting device 11, similar to that above described, and is shifted thereby into position in front of the end roll of the line III, the rolls and feed-rollers of which rotate in the same direction with the rolls and rollers of the line I. The piece is carried in the direction of the arrow through the three sets of rolls of this line, and its reduction is finished in its passage through the end set. The grooves of the sets of rolls through which the metal passes in succession are shaped so as to effect a gradual reduction of the metal into the ultimate form desired in a manner similar to the shaping of the rolls of a continuous mill. The series of rolls may thus be employed to effect a complete reduction of the metal from the form of a bloom to a rail; or, if desired, the bloom may be first reduced partially into rail form by any suitable three-high set of rolls or reversing rolls before being introduced into my improved system; or, if desired, the first set of rolls of the line I may be a set of three-high rolls and the metal bloom may be passed back and forth therethrough several times before being conveyed to the next set of rolls of the series. This is quite a practical arrangement and is not productive of very great loss of time, because in the first stages of the reduction the metal is short and does not consume nearly so much time in passing through the rolls as in the later stages of its reduction, when it is greatly elongated; but while such arrangement is within the scope of my invention I do not consider it so desirable as when all the rolls are two-high rolls arranged as above described, because when three-high rolls are used there is always some consequent loss of time, and there is the additional labor, machinery, and time used in transferring the piece vertically from one pass of the three-high rolls to the other.

In the system of rolls shown in the figures of the drawings just described the metal passes through each set of rolls in succession without separate handling at each, the only mechanical transfer other than of the rolls and feed-rollers being the lateral shifting of the metal at the end of each line of rolls from the last set of one line to the first set of the next; but this may be done very rapidly with simple mechanical transfer devices. The transfer from the line I to the line II is made on a slightly-downwardly-inclined plane, and the transfer from the line II to the line III on a slightly-upwardly-inclined plane. (See Fig. 3.) My system of rolls is therefore a continuous reversing system, because while the piece is carried as in a continuous mill through rolls in series without the necessity of passing through each set more than once it is not carried therethrough in an uninterrupted course; but its direction is reversed at the end of each line of rolls, and it is then carried in a direction parallel with but opposite to its course in the first line.

The advantages of my improvement will be appreciated by those skilled in the art. The possible output of the mill is very large, because the metal pieces may be passed through the rolls, following in as close succession as may be without interfering with each other in their elongation, and from the nature of the construction of the system of rolls it follows that the amount of machinery and power required to drive them is small, and that as regards space the arrangement of the rolls is compact and convenient.

My invention may be modified in various ways. Some of these modifications I have already described and others are shown in Figs. 4, 5, and 6. In the form of mill shown in Figs. 4 and 5 I dispense with the use of pinions between each pair of adjacent rolls, and am thus enabled to set the rolls more closely together and to economize space to a greater degree. Except for this difference in the mode of connecting and driving the adjacent rolls of each row, the general arrangement of the mill plant is similar to that shown in Fig. 1 and already described. Referring to Fig. 5, at the end of the row of rolls next to the engine is a set of three-high pinions 13, mounted in suitable housings, and at the side thereof are three-roll housings, preferably arranged in line with each other and with the pinion-housing. The axis of the middle pinion is coupled with the driving-shaft 3 of the engine, and by suitable couplings is connected with the upper roll of the set $c$ with the lower roll of the set $c'$ and with the upper roll of the set $c^2$, the axes of these three rolls and the axis of the middle pinion being, preferably, all in the same right line. The uppermost of the three pinions 13 is coupled with the upper roll of the set $c'$, the intermediate connection through the housing of the set $c$ being made by a driver or shaft 14, journaled in suitable bearings in said housing. The lowest of the three pinions is connected with the lower roll of the set $c$ and with the lower roll of the set $c^2$, the intermediate connection through the housing of the set $c'$ being made by an idler roll or shaft 15. It will thus be seen that the rolls of the set $c$ and $c^2$ will be driven to move the metal operated therein in the same direction, and the set $c'$ will be driven to move the metal in the opposite direction, and that in transferring the metal at the ends of the lines of rolls the transfer from the line I to the line II will be on an upwardly-inclined plane, while the transfer from the line II to the line III will be in a downwardly-inclined plane.

The modification illustrated in Fig. 6 is designed to enable the metal to be transferred laterally at the ends of the lines of rolls in a downwardly-inclined direction in both cases. In order to effect this, I employ in the housing 13 a four-high set of pinions, the driving-shaft being connected with one of the lowest of these pinions, preferably the second from the bottom. In the housing of the set $c$ there are two drivers or shafts 14 below the two rolls $c$. In the housing of the set $c'$ there is one such driver or shaft below the rolls. The upper roll of the set $c$ is coupled directly with the shaft of the top pinion. The pinion next below is coupled with the lower roll of the set $c$ and the upper roll of the set $c'$. The third pinion is coupled with the driver or shaft in the housing of the set $c$, with the lower roll of the set $c'$, and with the upper roll of the set $c^2$, and the lowest of the pinions is coupled to the lower roll of the set $c^2$ through the drivers or shafts 14 and 15 in the housings of the sets $c$ and $c'$.

The general arrangement and the manner of use of the modified form of mill which I have just described are or may be similar to the arrangement shown in Figs. 1 and 4.

A number of other modifications of my invention may be made by those skilled in the art, and I have illustrated the forms shown in the drawings for the purpose of making clear the nature and essential features of my invention and of indicating what I deem to be the best means for putting the same into practice. I do not, however, desire to limit the scope of my invention precisely to any of the forms of mill which I have shown and described, nor to the described arrangement of the driving-engines, unless expressly so stated in the claims, since, if desired, a greater or less number of engines than I have shown may be used in connection with the rolls. Nor do I wish to limit any of the several items of invention set forth in the following claim to use in connection with the devices specified in other claims; but

I claim—

In a rolling-mill plant, the combination of two or more lines of rolls, the laterally-adjacent sets of which are driven by common engines, intermediate feed-rollers, and laterally-acting transfer mechanism to transfer the metal from the end of one line of rolls to the next, substantially as and for the purposes described.

In testimony whereof I have hereunto set my hand this 19th day of August, A. D. 1891.

EDWARD L. CLARK.

Witnesses:
H. M. CORWIN,
C. S. CRAWFORD.